Jan. 7, 1941.    B. H. SMITH    2,228,090
TACHOMETER
Filed Jan. 18, 1939
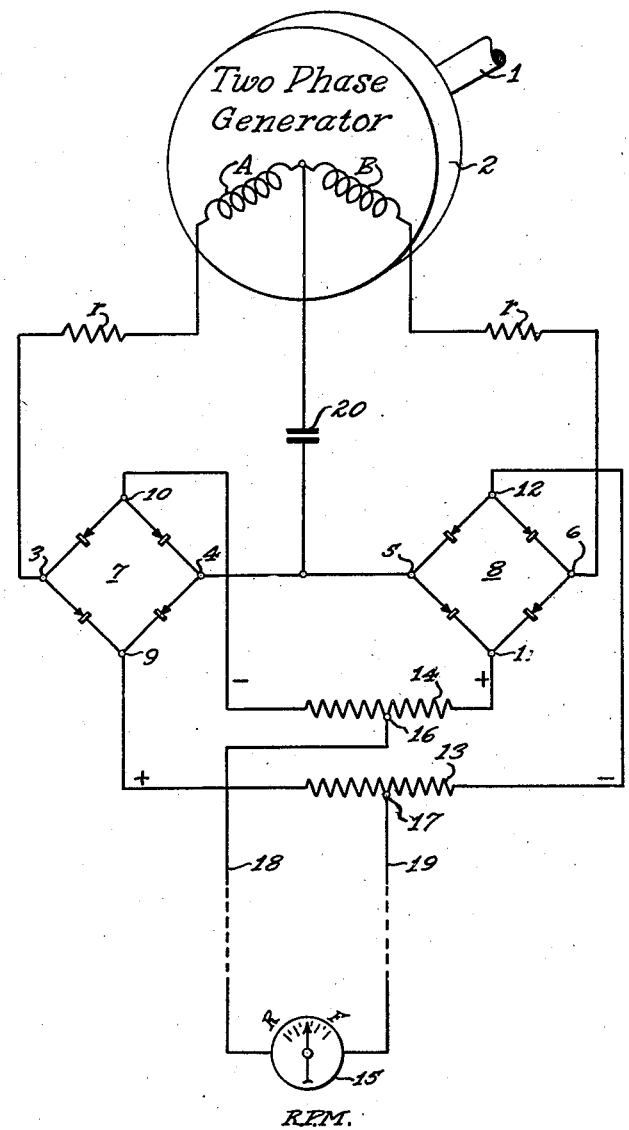
WITNESSES;
INVENTOR
Benjamin H. Smith.
BY
ATTORNEY Patented Jan. 7, 1941

2,228,090

UNITED STATES PATENT OFFICE 2,228,090

TACHOMETER

Benjamin H. Smith, Bloomfield, N. J., assignor to Westinghouse Electric & Manufacturing Company, East Pittsburgh, Pa., a corporation of Pennsylvania Application January 18, 1939, Serial No. 251,554

13 Claims. (Cl. 175—183)

This invention relates to tachometers, and it has particular relation to tachometers for measuring both the direction and rate of rotation of bodies.

In my copending application, Serial No. 212,439, filed June 8, 1938, I have disclosed a high output inductor generator particularly suited for tachometers. When only the rate of rotation of a body is to be measured, this generator may be connected to a suitable instrument in a manner well known in the art. However, some applications of tachometers require that, in addition to the rate of rotation, the direction of rotation also be indicated. An example of such an application may be found in tachometers for marine service. Since rotating shafts on vessels are not visible and their direction of rotation is not readily apparent, it is clear that an indication of the rate of rotation alone would not suffice.

In accordance with my invention, a polyphase generator is employed for measuring both rate and direction of rotation of a body. In a specific embodiment of my invention, a two-phase, three-wire generator is provided with a rectifier for each phase. The outputs of the rectifiers are connected in opposition to a center zero indicating instrument. By placing an impedance, such as a capacitive reactance or condenser, in the common lead of the three-wire, two-phase generator, the polarity of the direct currents applied to the indicating instrument will depend on the direction of rotation of the generator, and the magnitude of the direct-current voltage applied to the instrument will depend upon the rate of rotation of the generator.

It is, therefore, an object of my invention to provide a simple tachometer installation for measuring both the rate and direction of rotation of a body.

It is another object of my invention to provide a tachometer for measuring both the rate and direction of rotation of a body which requires only two conductors for supplying energy to an indicating instrument.

It is a further object of my invention to provide a two-phase generator with means for varying the relative outputs of the two phases in accordance with the direction of rotation of the generator.

Other objects of my invention will be apparent from the following description taken in conjunction with the accompanying drawing, in which the single figure is a diagrammatic view of a tachometer embodying my invention.

Referring to the drawing, I have illustrated a rotatable shaft 1, the rate and direction of rotation of which are to be measured. For this purpose, a generator 2 is coupled in any suitable manner to the shaft 1 for rotation in accordance with the rotation of the shaft. Although I may employ various types of polyphase generators, I prefer to employ a two-phase generator of the high output type disclosed in my aforesaid application. This generator is of the two-phase, three-wire type, the phase windings being depicted on the drawing as coils A and B.

Each of the phases A and B is connected across the input terminals 3, 4 and 5, 6 of an independent rectifier 7, 8. These rectifiers may be of the copper oxide contact type and are illustrated as full-wave rectifiers. However, it is to be understood that any other suitable rectifier known to the art may be employed. If desired, these rectifiers may be provided with filters for smoothing the direct-current outputs thereof in a manner known to the art. The voltage applied to the rectifiers may be limited by means of resistances $r$ included in the connections between the generator and the rectifiers. These resistances may be omitted in many cases.

The output terminals 9, 10 and 11, 12 of the rectifiers 7 and 8 are connected in a series circuit, which may include a pair of current limiting impedances, such as resistors 13 and 14. The polarities of these terminals are indicated on the drawing, terminals 9 and 11 being positive, and terminals 10 and 12 being negative. Energy for an indicating instrument 15 is obtained from the series circuit through a pair of taps 16 and 17 on the resistors which are connected to the instrument through a pair of conductors 18 and 19. Although the indicating instrument may be of any type known to the art, I prefer to employ a sensitive D'Arsonval type of instrument having a center zero. As illustrated, the instrument 15 is provided with markings R and F for denoting respectively "Reverse" and "Forward" rotation of the shaft 1.

An impedance 20 is inserted in the common lead of the three-wire generator for providing an output of the generator that is dependent upon the direction and rotation of the shaft 1.

Although an inductive impedance may be employed, I prefer a capacitive reactance or condenser as illustrated.

It should be noted that the input voltage to the rectifier 7 is the vector difference between the voltage supplied by phase A of the generator and the voltage drop across the capacitive reactance 20. Similarly, the voltage supplied to the rectifier 8 is equal to the voltage supplied between phase B of the generator less the voltage drop across the capacitive reactance 20. Since the generator is provided with two phases, it follows that according to the direction of rotation thereof, either phase A or phase B may provide a leading voltage. That is, if for clockwise rotation of the generator, the voltage across phase A leads the voltage across phase B by 90 electrical degrees, then for counter-clockwise rotation of the generator the voltage across phase B leads the voltage across phase A by 90 electrical degrees.

The voltage drop across the capacitive reactance 20 is not symmetrical with respect to the two phase voltages of phases A and B. For that reason, the voltages across the inputs to the rectifiers 7 and 8 will be dissimilar. Furthermore, this dissimilarity is reversible in accordance with the direction of rotation of the generator for the reason that the relationship of the voltages across the phases A and B reverses with reversal of the direction of rotation of the generator.

This may be illustrated more specifically by assuming a clockwise rotation of the generator. In this case, the voltage across the phase A leads the voltage across the phase B by 90 degrees. Under the assumed conditions, the vector resultant of the voltage across the phase A and the voltage drop across the impedance 20 is larger than the resultant of the voltage drop across the phase B and the voltage drop across the impedance 20. Consequently, the input voltage to the rectifier 7 will be larger than the input voltage to the rectifier 8, and the larger voltage of the rectifier 7 controls the indication of the instrument 15. If the rotation of the generator reverses because of reversal of rotation of the shaft 1, the voltage across the phase B now leads the voltage across the phase A by 90 electrical degrees, and the resultant voltage applied to the input terminals of the rectifier 8 will be greater than that applied to the input terminals of the rectifier 7. Therefore, the direct-current output of the rectifier 8 controls the indication of the instrument 15.

Since the polarities of the rectifiers 7 and 8 are reversed relative to the instrument 15, it follows that the direction of deflection of the pointer of the instrument 15 is dependent upon the particular rectifier which controls the deflection; that is, when the voltage output of the rectifier 7 exceeds that of the rectifier 8, the pointer of the instrument 15 will be deflected clockwise to indicate that the shaft 1 is rotating in the forward direction, but if the voltage output of the rectifier 8 exceeds that of the rectifier 7, the pointer of the instrument 15 will be deflected in a counter-clockwise direction to indicate reverse rotation of the shaft 1.

The difference between the voltage outputs of the rectifiers 8 and 7 is dependent upon the speed of rotation of the generator. Consequently, the degree of deflection of the pointer of the instrument 15 is a measure of the rate of rotation of the generator and may be calibrated to represent the rotation of the shaft 1 in revolutions per minute or any other desired unit.

The installation and operation of the complete tachometer designed in accordance with my invention may be briefly recapitulated: A two-phase generator is coupled for rotation from a shaft 1, the rotation of which is to be measured. The rectifiers 7 and 8 together with the associated resistors 13 and 14 and the capacitive reactance 20 all may be placed in the generator frame or adjacent thereto. This means that the only wiring required between the rotating shaft and the indicating instrument 15 is represented by two conductors 18 and 19, one of which may, of course, be replaced by ground in certain installations. More than one instrument may be connected to the conductors 18 and 19 either in series or in parallel as desired.

Because of the capacitive reactance 20, a voltage will be applied to the rectifier 7, which will be larger or smaller than the voltage applied to the rectifier 8, in accordance with the direction of rotation of the generator. The difference between these voltages will vary in accordance with the rate of rotation of the generator in either direction. If the voltage applied to the rectifier 7 is smaller than that applied to the rectifier 8, current will flow from the tap 17 to the conductor 19 through the instrument 15, conductor 18, and tap 16. If the voltage applied to the rectifier 7 is smaller than that applied to the rectifier 8, indicating reversal of the direction of rotation of the generator, current will then flow from the tap 16 through the conductor 18, instrument 15, conductor 19, back to the tap 17; that is, the direction of current flow through the conductors 18 and 19 and the instrument 15 is dependent upon the direction of rotation of the generator. This direction of flow represents one variable characteristic controlled by the direction of rotation of the shaft 1.

A second variable characteristic of the energy applied to the conductors 18, 19 is that of magnitude which is controlled by the difference between the voltages applied to the rectifiers 7 and 8, and this difference in turn is a function of the rate of rotation of the generator. These two variables determine the direction of rotation of the pointer of the instrument 15 and the magnitude of deflection thereof. Therefore, the position of the pointer indicates completely the condition of rotation of the shaft 1.

Although I have described my invention with reference to certain specific embodiments thereof, it is obvious that various modifications thereof are possible. Therefore, I do not wish my invention to be restricted except as required by the appended claims when interpreted in view of the prior art.

I claim as my invention:

1. In an electrical device for measuring the speed and direction of rotation of a rotating body, a source of alternating current having a first characteristic varying in accordance with the speed of rotation of said body in either direction, and having a second characteristic varying in accordance with the direction of rotation of said body, a direct-current measuring instrument having a pair of input terminals, and means for supplying to said terminals a direct current having two variable characteristics controlled by said first and second characteristics.

2. In an electrical system, a polyphase generator having a rotatable element, an electroresponsive device, a pair of conductors for supplying energy to said device and means controlled by the output of said polyphase generator for supplying direct current energy having a polarity varying in accordance with the direction of rotation of said rotatable element to said conductors.

3. In an electrical measuring device responsive to the rotation of a reversible rotating body, a polyphase generator having a rotatable element mounted for rotation in accordance with rotation of said body, means for varying the magnitude ratio of the voltages supplied by two phases of said generator in accordance with the direction of rotation of said rotatable element, and measuring means responsive to said ratio.

4. In a supply system, a two-phase generator having a rotatable element, a lead common to both phases, a load across each of said phases, and means in said common lead for varying the proportion of a characteristic of the energy supplied by the phases of said generator in accordance with the direction of rotation of said generator.

5. In a measuring system, a first source of alternating current, a second source of alternating current, a rectifier unit for each of said sources, an electro-responsive device connected to said rectifier units, said rectifier units being opposed relative to said electro-responsive device, and means for varying the difference between a characteristic of the outputs from said sources in accordance with a predetermined variable.

6. In a measuring system, a two-phase generator having a terminal common to both phases and an additional terminal for each phase, a reactance, a lead connected to said common terminal through said reactance, and an electro-responsive device controlled by the ratio of the outputs between said lead and each of said additional terminals.

7. In a measuring system, a two-phase generator having a terminal common to both phases, and an additional terminal for each phase, a capacitance, a lead connected to said common terminal through said capacitance, a pair of rectifier units, each rectifier unit being energized in accordance with the output between said lead and a separate one of said additional terminals, connections for connecting the outputs of said rectifiers in series, said connections including resistance means, and an electro-responsive device energized from said series connected rectifiers through said resistance means.

8. In a tachometer, a three-wire, two-phase inductor generator, a rectifier connected across each of said phases, a capacitance in the lead common to both of the phases of said generator, said rectifiers having their outputs connected in an additive series circuit, a direct-current responsive instrument connected across said series circuit, and impedance means in said series circuit between said instrument connection and each of said rectifiers.

9. In an electrical device responsive to the rotation of a rotating body, direct current translating means, and energizing means for supplying to said direct current translating means a direct current quantity having a polarity varying in accordance with the direction of rotation of said rotating body, said energizing means including a source of alternating current having an output controlled by the rotation of said rotating body, and means for deriving from said output said direct current quantity for energizing said direct current translating means.

10. In an electrical device responsive to the rotation of a rotating body, direct current translating means, and energizing means for supplying to said direct current translating means a direct current quantity having a polarity varying in accordance with the direction of rotation of said rotating body, and having a magnitude varying in accordance with the rate of rotation of said rotating body, said energizing means including a source of alternating current having an output controlled by the direction and rate of rotation of said rotating body, and rectifying means for converting said output into said direct current quantity.

11. In an electrical device responsive to the rotation of a rotating body, a rotatable polyphase generator, means for varying the ratio of the voltage magnitudes of separate phases of said polyphase generator in accordance with the direction of rotation of said polyphase generator, means for rectifying the outputs of said separate phases into direct current quantities, and translating means controlled by said direct current quantities.

12. In an electrical device responsive to the rotation of a rotating body, a rotatable polyphase generator, means for varying the ratio of the voltage magnitudes of separate phases of said polyphase generator in accordance with the direction of rotation of said polyphase generator, means for rectifying the outputs of said separate phases into direct current quantities, and translating means controlled by said direct current quantities, said translating means including indicating means controlled by the difference in magnitudes of said direct current quantities and controlled by the polarity of the predominating direct current quantity, the polarities of said direct current quantities differing relative to said indicating means.

13. In a system responsive to the rate and direction of rotation of a rotating body, a two-phase alternating current generator connected for rotation in accordance with the rotation of the body to be measured, a rectifier connected across each phase of said generator, said phases having a common lead connected to said rectifiers, a capacitance in said common lead, and direct current translating means connected for energization from said rectifiers, said rectifiers being reversed in polarity relative to said direct current translating means.

BENJAMIN H. SMITH.